(12) United States Patent
Shikata

(10) Patent No.: US 8,144,236 B2
(45) Date of Patent: Mar. 27, 2012

(54) PHOTOGRAPHY DEVICE AND PHOTOGRAPHY METHOD

(75) Inventor: Daisuke Shikata, Kurokawa-gun (JP)

(73) Assignee: Fujifilm Corporation, Tokyo (JP)

( * ) Notice: Subject to any disclaimer, the term of this patent is extended or adjusted under 35 U.S.C. 154(b) by 449 days.

(21) Appl. No.: 12/389,529

(22) Filed: Feb. 20, 2009

(65) Prior Publication Data

US 2009/0231482 A1  Sep. 17, 2009

(30) Foreign Application Priority Data

Mar. 17, 2008  (JP) .................. 2008-068362

(51) Int. Cl.
*G03B 17/00* (2006.01)
(52) U.S. Cl. ......................... 348/345; 396/77
(58) Field of Classification Search .......... 348/345; 396/77, 79, 80
See application file for complete search history.

(56) References Cited

U.S. PATENT DOCUMENTS 7,469,097 B2 * 12/2008 Yost et al. ............. 396/77
2004/0189804 A1 * 9/2004 Borden et al. ............. 348/169

FOREIGN PATENT DOCUMENTS

| JP | 05-130481 A | 5/1993 |
|---|---|---|
| JP | 07-336569 A | 12/1995 |
| JP | 2001-211360 A | 8/2001 |

* cited by examiner

*Primary Examiner* — Clayton E Laballe
*Assistant Examiner* — Noam Reisner
(74) *Attorney, Agent, or Firm* — Sughrue Mion, PLLC

(57) ABSTRACT

A photography device that includes an imaging component, a focusing component, a magnification alteration component, a display component, an acquisition component and a control component is provided. The focusing component focuses a subject image on an imaging surface of the imaging component. The magnification alteration component alters a magnification of the subject image focused by the focusing component. The acquisition component acquires a focusing evaluation value representing a degree of focusing of the subject image by the focusing component. The control component performs focusing control by controlling the focusing component such that the focusing evaluation value acquired by the acquisition component is at a maximum, and controls the magnification alteration component so as to lower a display magnification of the subject image by the display component if the focusing evaluation value is at or below a prespecified threshold value.

4 Claims, 12 Drawing Sheets

LOW ← ZOOM RATIO → HIGH

PHOTOGRAPHY DEVICE AND PHOTOGRAPHY METHOD

CROSS-REFERENCE TO RELATED APPLICATION

This application claims priority under 35 USC 119 from Japanese Patent Application No. 2008-068362, the disclosure of which is incorporated by reference herein.

BACKGROUND OF THE INVENTION

1. Field of the Invention

The present invention relates to a photography device and photography method that acquire image information representing a subject image by photography.

2. Description of the Related Art

Heretofore, it has been proposed that cameras be provided with magnifying zoom functions, which magnify subject images that are photographed. In recent years, installation of high magnification zoom functions even in compact cameras has been desired.

When photography is performed using a high magnification zoom function, there is a large difference between the viewing angle to be photographed and a person's own field of view. Consequently, determining a viewing angle, a photograph composition and the like may be difficult. Thus, in an image obtained with high magnification zoom, if the user's composition technique or movement is even slightly misplaced, the viewing angle and composition are greatly misplaced.

Previously, as a technology for facilitating the determination of an image composition, for example, Japanese Patent Application Laid-Open (JP-A) No. 2001-211360 has described that, with the viewfinder of a video camera that is photographing a moving image, a viewing angle wider than the viewing angle that is being photographed is imaged, and display of a viewing angle range that includes the viewing angle range to be photographed and that is wider than this viewing angle is enabled, in order to enable verification of conditions at the outside of the viewing angle being photographed.

Similarly, JP-A No. 7-336569 has described that, when a moving image is being photographed, an optical zoom range of a zoom lens is divided into two or more steps, the optical zoom and an electronic zoom are alternately operated, and when a viewing angle switching switch is operated, only a viewfinder screen returns to a wide-angle display.

Furthermore, JP-A No. 5-130481 has described limiting a zoom magnification in accordance with an image shake ratio, in order to prevent image shake that exceeds an image shake correction range from occurring during photography.

However, the technologies of JP-A Nos. 2001-211360, 7-336569 and 5-130481 have a problem, are not being able to respond to a case of a large displacement from a subject image that is to be photographed.

That is, in a case of a large displacement from the subject image that is to be photographed, it is necessary for a photographer to carry out operations of temporarily lowering the zoom ratio until the subject image that is to be photographed re-enters a range in which photography is possible, identifying the subject image that is to be photographed, and then increasing the zoom ratio again.

SUMMARY OF THE INVENTION

The present invention has been made in order to solve the problem described above, and an object of the present invention is to provide a photography device and photography method capable of assisting in a determination of composition by a photographer when altering a magnification ratio of a subject image and performing photography.

In order to achieve the objective described above, a first aspect of the present invention is a photography device including: an imaging component that images a subject and acquires an image representing the subject; a focusing component that focuses a subject image on an imaging surface of the imaging component; a magnification alteration component that alters a magnification of the subject image focused by the focusing component; a display component that displays the subject image in real time on the basis of image information acquired by the imaging component; an acquisition component that acquires a focusing evaluation value representing a degree of focusing of the subject image from the imaging component; and a control component that performs focusing control by controlling the imaging component such that the focusing evaluation value acquired by the acquisition component is at a maximum, and controls the magnification alteration component so as to lower a display magnification of the subject image by the display component if the focusing evaluation value is at or below a pre-specified threshold value.

According to the first aspect, the focusing control is carried out on the basis of the focusing evaluation value. If the focusing evaluation value is below the pre-specified threshold, the display magnification of the subject image is lowered. Thus, if the subject image has been excessively magnified, or if the target of photography has been misplaced, or the like, the subject is displayed at the display component in a wider range than the photography range therebefore, and the photographer can more easily ascertain a composition that is to be photographed. Therefore, according to the first aspect, a determination of composition by a photographer when altering a magnification ratio of a subject image and performing photography can be assisted.

A second aspect of the present invention is the photography device according to the first aspect, further including a storage component that stores the focusing evaluation value acquired by the acquisition component, wherein the control component controls so as to lower the display magnification of the subject image by the display component if the focusing evaluation value acquired by the acquisition component at a current point in time has fallen by at least a pre-specified threshold value from the focusing evaluation value stored by the storage component a predetermined duration before.

A third aspect of the present invention is the photography device according to the second aspect, wherein the control component increases a degree of the lowering of the display magnification by the display component in accordance with a magnitude of a degree of the fall of the focusing evaluation value.

A fourth aspect of the present invention is the photography device according to the first aspect, wherein the control component, before controlling so as to lower the display magnification of the subject image by the display component, controls the display component so as to implement a pre-specified display relating to this control.

A fifth aspect of the present invention is a photography device including: an imaging component that images a subject and acquires an image representing the subject; a focusing component that focuses a subject image on an imaging surface of the imaging component; a magnification alteration component that alters a magnification of the subject image focused by the focusing component; a display component that displays the subject image in real time on the basis of image information acquired by the imaging component; an acquisition component that divides the subject image represented by the image information into a pre-specified number of divisions, and acquires a focusing evaluation value representing a degree of focusing of the subject image from the imaging component on the basis of the image information that corresponds to at least one region of regions of the divisions; and a control component that performs focusing control by controlling the imaging component such that the focusing evaluation value acquired by the acquisition component is at a maximum, stores a division region that is used when performing the focusing control as a focusing subject, and, if the focusing evaluation value of the focusing subject falls significantly, controls the display component so as to implement a display indicating the fall.

A sixth aspect of the present invention is a photography method including: (a) displaying, in real time at a display component, a subject image based on image information that is focused at an imaging surface of an imaging component, which images a subject and acquires an image representing the subject; (b) acquiring a focusing evaluation value representing a degree of focusing of the subject image; and (c) performing focusing control that focuses the subject image at the imaging surface such that the acquired focusing evaluation value is at a maximum and, if the focusing evaluation value is at or below a pre-specified threshold value, controlling so as to lower a display magnification of the subject image by the display component.

As described above, according to the present invention, there is an effect in that a determination of composition by a photographer when altering a magnification ratio of a subject image and performing photography can be assisted.

DETAILED DESCRIPTION OF THE INVENTION

Herebelow, the best embodiment for carrying out the present invention will be described in detail with reference to the drawings.

First Exemplary Embodiment

Figure 1:
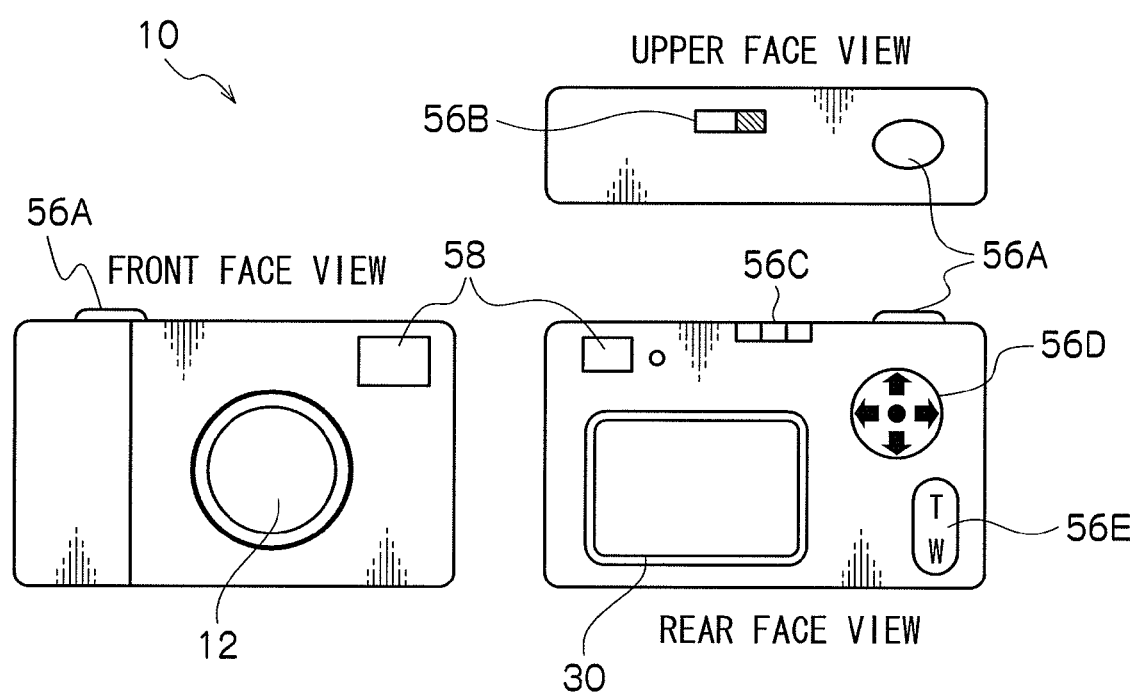
FIG. 1 is external views of a digital camera relating to a first exemplary embodiment of the present invention.

Firstly, external structures of a digital camera 10 relating to the first exemplary embodiment will be described with reference to FIG. 1. As is shown in FIG. 1, a lens 12, for focusing a subject image, and a viewfinder (an OVF, or optical viewfinder) 58, which is used for determining the composition of a subject to be photographed, are provided at the front face of the digital camera 10. A release button ("shutter") 56A, which is pressed for operation by a photographer when photography is to be executed, and a power switch 56B are provided at an upper face of the digital camera 10.

The release button 56A relating to the present exemplary embodiment is constituted to be capable of detecting two stages of pressing operation: a state of being pressed down to an intermediate position (herebelow referred to as a half-pressed state) and a state of being pressed down beyond the intermediate position to a final lowermost position (below referred to as a full-pressed state).

At the digital camera 10 relating to the present exemplary embodiment, when the release button 56A is put into the half-pressed state, an AE (automatic exposure) function operates and exposure conditions (a shutter speed and an aperture state) are specified, and then an AF (auto focus) function operates to control focusing. Thereafter, when the release button 56A is further put into the full-pressed state, exposure (photography) is carried out.

An eyepiece portion of the aforementioned viewfinder 58, a liquid crystal display (below referred to as an LCD) 30, a mode switch 56C, a cross-cursor button 56D and a zoom control 56E are provided at a rear face of the digital camera 10. The LCD 30 is for displaying subject images represented by digital image data obtained by photography, and various menu screens, messages and the like. The mode switch 56C is operated by sliding to set one of a photography mode, which is a mode for carrying out photography, and a replay mode, which is a mode for displaying (replaying) at the LCD 30 subject images represented by digital image data which has been obtained by photography. The cross-cursor button 56D is structured to include four arrow keys representing four directions of movement-up, down, left and right-in a display region of the LCD 30. The zoom control 56E is operated when zooming (magnification or reduction) of the subject image is to be carried out at a time of photography.

The cross-cursor button 56D is structured to include a total of five keys, the four arrow keys representing the four directions of movement up, down, left and right in the display region of the LCD 30, and a select key disposed at a central portion of the four arrow keys. The zoom control 56E is structured by a telephoto switch, corresponding to the position of the 'T' in FIG. 1, which is operated when the subject image is to be magnified, and a wide angle switch, corresponding to the position of the 'W' in FIG. 1, which is operated when the subject image is to be reduced.

Figure 2:
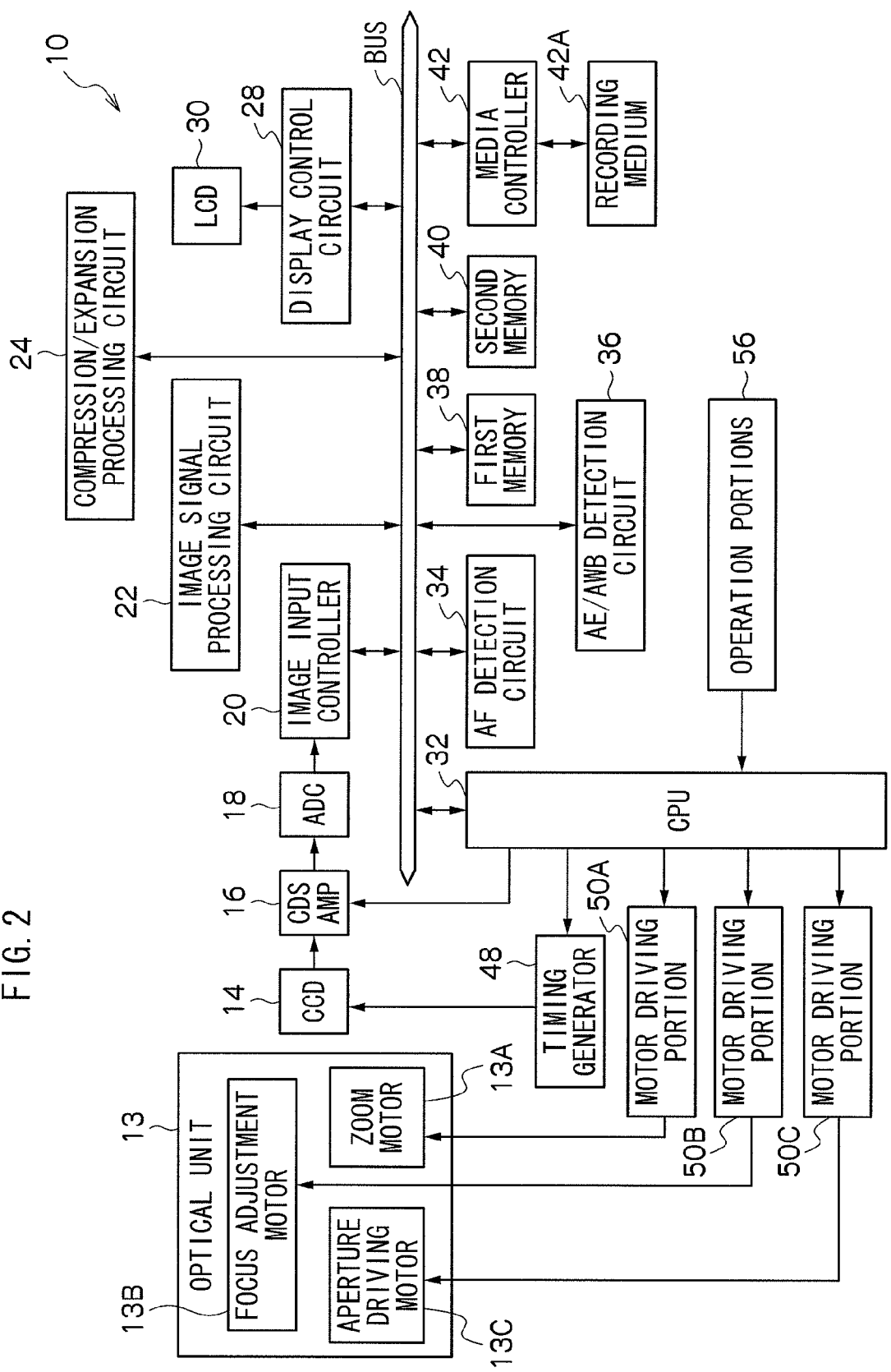
FIG. 2 is a block diagram showing structure of an electronic system of the digital camera relating to the first exemplary embodiment of the present invention.

Next, structure of an electronic system of the digital camera 10 relating to the present exemplary embodiment will be described with reference to FIG. 2. As shown in FIG. 2, the digital camera 10 is structured to include a CPU (central processing unit) 32, a first memory 38 and a second memory 40. The CPU 32 administers overall operations of the digital camera 10. The first memory 38 is used as a work memory at times of execution of various processes by the CPU 32, and the like. The second memory 40 principally stores the digital image data obtained by photography. The CPU 32, the first memory 38 and the second memory 40 are respectively connected to one another through a bus.

The digital camera 10 is further structured to include a media controller 42, which is for enabling access by the digital camera 10 to a removable recording medium 42A in the body of the digital camera 10. The media controller 42 is also connected to the bus.

Thus, from the CPU 32, access to the first memory 38 and the second memory 40, and access to the recording medium 42A via the media controller 42, can be respectively implemented.

The first memory 38 may be constituted by, for example, an SDRAM (synchronized dynamic random access memory) and the second memory 40 may be constituted by, for example, a VRAM (video RAM), respectively.

As is also shown in FIG. 2, an optical unit 13, a CCD (charge coupled device) 14 and a timing generator 48 are provided in the digital camera 10. The optical unit 13 is structured to include the aforementioned lens 12. The CCD 14 is disposed to rearward on the optical axis of the lens 12. The timing generator 48 principally generates timing signals for driving the CCD 14 and provides the timing signals to the CCD 14.

An input terminal of the timing generator 48 is connected to the CPU 32 and an output terminal of the timing generator 48 is connected to the CCD 14. Driving of the CCD 14 is controlled by the CPU 32 via the timing generator 48.

The lens 12 included in the optical unit 13 relating to the present exemplary embodiment includes a plurality of lenses, and is constituted to serve as a zoom lens capable of altering the focusing distance (altering magnification). A lens driving mechanism is provided that is structured to include a zoom motor, a focus adjustment motor and an aperture driving motor. Output terminals of motor driving portions 50A, 50B and 50C are connected to a zoom motor 13A, a focus adjustment motor 13B and an aperture driving motor 13C, respectively.

The input terminals of the motor driving portions 50A, 50B and 50C are each connected to the CPU 32. The zoom motor 13A, focus adjustment motor 13B and aperture driving motor 13C are respectively driven by driving signals provided from the respective motor driving portions 50 under the control of the CPU 32.

When an optical zoom magnification is to be altered, the CPU 32 controls to drive the zoom motor 13A and the focusing distance of the lens 12 included in the optical unit 13 is altered.

The digital camera 10 is yet further structured to include a correlated doubled sampling circuit (below referred to as a CDSAMP) 16 and an analog/digital converter (below referred to as an ADC) 18, which converts inputted analog signals into digital data. An input terminal of the CDSAMP 16 is connected to an output terminal of the CCD 14, and an output terminal of the CDSAMP 16 is connected to an input terminal of the ADC 18.

At the CDSAMP 16, with a view to moderating noise and the like included in output signals from the CCD 14, processing is carried out to obtain accurate image data by taking differences between feed-through component levels and image signal component levels which are included in the output signals of individual pixels, which are solid state imaging elements.

Operation portions 56, including the aforementioned release button 56A, power switch 56B, mode switch 56C, cross-cursor button 56D and zoom control 56E, are connected to the CPU 32. Thus, the CPU 32 can continuously identify operational states of the respective operation portions 56.

The digital camera 10 is structured to include an image input controller 20, an image signal processing circuit 22, a compression/expansion processing circuit 24 and a display control circuit 28. The image input controller 20 incorporates a line buffer with a predetermined capacity and performs control to directly store inputted digital image data in a predetermined region of the second memory 40. The image signal processing circuit 22 carries out various kinds of image processing on the digital image data. The compression/expansion processing circuit 24 performs compression processing on the digital image data into a predetermined compression format, and performs expansion processing on digital image data that has been compressed. The display control circuit 28 supplies, to the LCD 30, signals for displaying images represented by digital image data and menu screens and the like at the LCD 30. Here, an output terminal of the ADC 18 is connected to an input terminal of the image input controller 20.

The digital camera 10 is still further structured to include an AF detection circuit 34, which detects a physical quantity required for operating the aforementioned AF function, and an AE/AWB detection circuit 36, which detects physical quantities required for operating the aforementioned AE function and an AWB (automatic white balance) function.

As the physical quantity detected by the AF detection circuit 34, an AF evaluation value which represents a high frequency component of luminance (a contrast value) in an AF region of an image obtained by imaging by the CCD 14 is detected. As the physical quantities detected by the AE/AWB detection circuit 36, luminance information and color difference information which represent brightness of an image obtained through the CCD 14 are detected.

That is, in the present exemplary embodiment, a "TTL" (through the lens) system is used as the above-mentioned AF function. The TTL system sets the position of a focusing lens by controlling driving of the focus adjustment motor 13B via the motor driving portion 50A, on the basis of the AF evaluation value detected by the AF detection circuit 34, so as to maximize contrast in the image obtained by imaging by the CCD 14.

The above-mentioned image input controller 20, image signal processing circuit 22, compression/expansion processing circuit 24, display control circuit 28, AF detection circuit 34 and AE/AWB detection circuit 36 are respectively connected to one another through the above-mentioned bus that is connected to the CPU 32 and the like.

Thus, the CPU 32 can implement control of operations of each of the image input controller 20, the image signal processing circuit 22, the compression/expansion processing circuit 24 and the display control circuit 28, and of acquisition of the physical quantities detected by the AF detection circuit 34 and the AE/AWB detection circuit 36.

Now, in the digital camera 10 relating to the present exemplary embodiment, if the AF evaluation value at which the image contrast is maximized falls below a predetermined threshold value Th, then the zoom ratio is lowered.

Figure 3A:
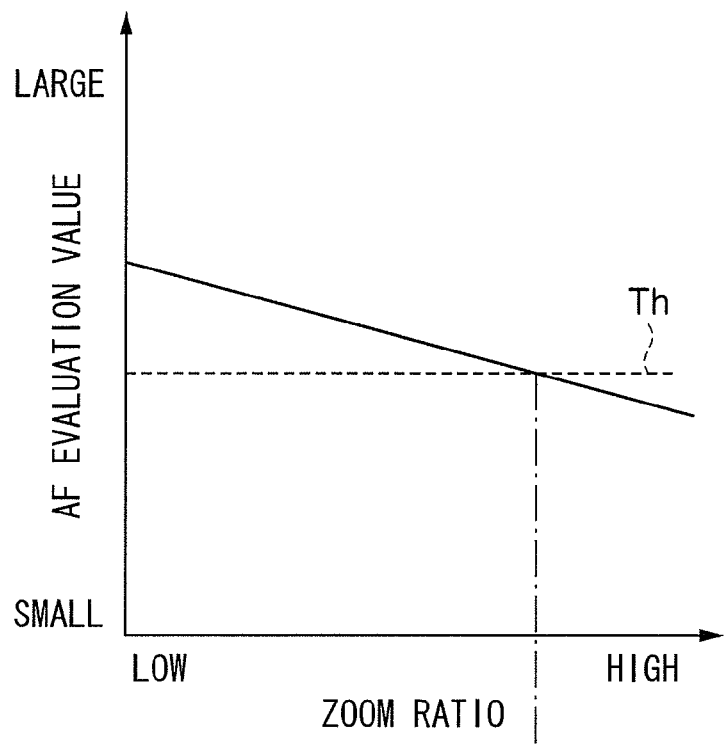
FIG. 3A shows an example of a change in an AF evaluation value when image contrast is maximized when a zoom ratio is altered.

FIG. 3A shows an example of a change in AF evaluation value when image contrast is maximized when the zoom ratio is altered. As is shown in FIG. 3A, the higher the zoom ratio, the more difficult it is to raise the contrast of the image, and the smaller the AF evaluation value tends to be. Note that the trend shown in FIG. 3A is an example; changes are not limited to being linear as shown in FIG. 3A, and will differ in accordance with compositions, shapes and the like of subject images.

Figure 3B:
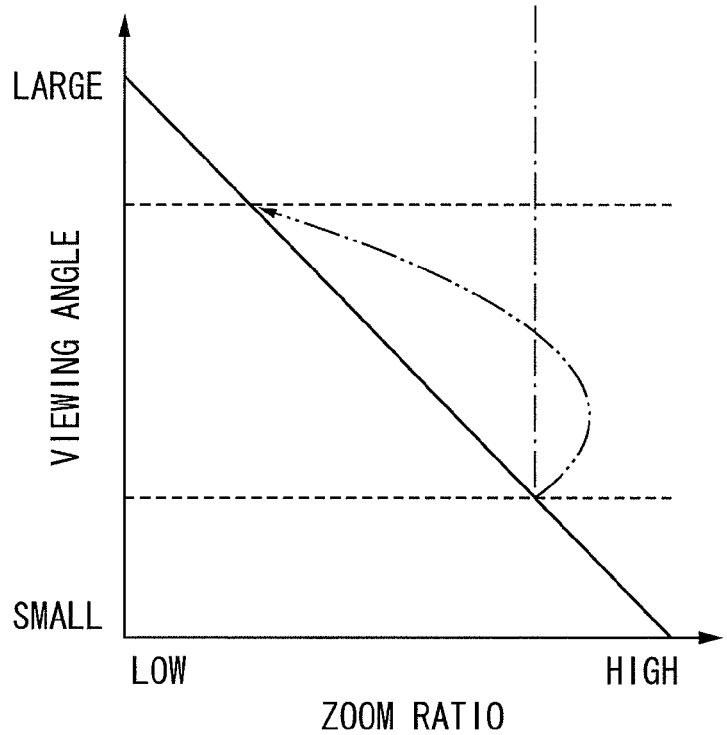
FIG. 3B shows magnitudes of viewing angles when the zoom ratio is altered.

FIG. 3B shows magnitudes of viewing angles when the zoom ratio is altered. The viewing angles represent angles of incident light. The larger the viewing angle, the more subjects are included in an imaging region, while the smaller the viewing angle, the fewer subjects are included in the imaging region.

Figure 4A:
FIG. 4A, FIG. 4B and FIG. 4C show respective images obtained when the same subject image is photographed with different zoom ratios.
Figure 4B:
Figure 4B:
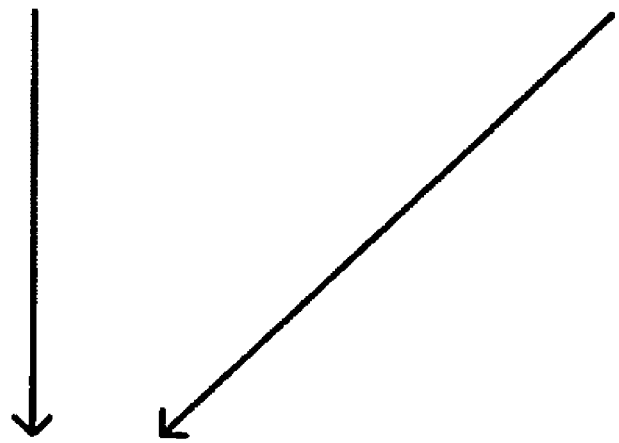
Figure 4C:
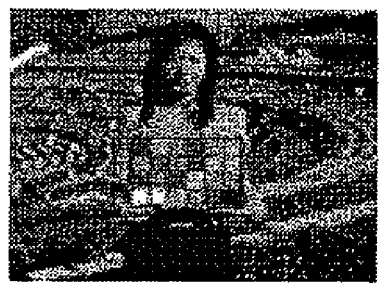

FIG. 4A to FIG. 4C show respective images obtained when the same subject image is photographed with different zoom ratios. FIG. 4A and FIG. 4B show cases in which the subject image is photographed with high zoom ratios, and FIG. 4C shows a case in which the subject image is photographed with a low zoom ratio.

When the zoom ratio is low, as shown in FIG. 4C, many subject images are imaged, whereas when the zoom ratio is high, as shown in FIG. 4A, the imaging region is narrower, the AF evaluation value of a subject image is lower, and there is a tendency for subject images to not be expressed clearly. Furthermore, if the target of photography is misplaced when the zoom ratio is high, due to the effects of hand shake or the like, then there is a tendency for it to be unclear what is being pictured, as is shown in FIG. 4B.

That is, as shown in FIG. 4A and FIG. 4B, when the AF evaluation value is lower than the threshold value Th shown in FIG. 3A, then, as shown by the broken line arrow in FIG. 3B, the zoom ratio is lowered and the viewing angle is increased, and a range of visible subject images is widened.

Next, operation of the digital camera 10 relating to the present exemplary embodiment will be described.

As overall operations of the digital camera 10 at a time of photography, firstly, imaging is carried out by the CCD 14 through the optical unit 13, and signals representing a subject image are sequentially outputted from the CCD 14. Hence, the signals outputted from the CCD 14 are sequentially inputted into the CDSAMP 16 and subjected to correlated double sampling processing, and then inputted into the ADC 18. The ADC 18 converts signals of R (red), G (green) and B (blue) inputted from the CDSAMP 16 into respective 12-bit R, G and B signals (i.e., digital image data), and outputs the same to the image input controller 20.

The image input controller 20 collects the digital image data sequentially inputted thereto from the ADC 18 in the line buffer incorporated therein, and temporarily stores the digital image data in the predetermined region of the second memory 40.

The digital image data stored in the predetermined region of the second memory 40 is read out by the image signal processing circuit 22 under the control of the CPU 32, and is subjected to white balance adjustment, in which digital gain is applied in accordance with the physical quantities detected by the AE/AWB detection circuit 36. In addition, gamma processing and sharpness processing are applied and 8-bit digital image data is generated. Further, YC signal processing is applied to generate luminance signals Y and chroma signals Cr and Cb (below referred to as YC signals). The YC signals are stored at a region of the second memory 40 different from the above-mentioned predetermined region.

Herein, the LCD 30 is constituted to be employable as a viewfinder (an EVF, which is an electronic viewfinder), displaying a moving image obtained by continuous imaging by the CCD 14 (a through-image). When the LCD 30 is employed as a viewfinder in this manner, the YC signals that are generated are outputted to the LCD 30 via the display control circuit 28. Hence, the through-image is displayed at the LCD 30.

Now, when the release button 56A is put into the half-pressed state by a user, as mentioned earlier, the AE function operates and sets exposure conditions, and then the AF function operates and performs focusing control. Thereafter, if the user continues on to the full-pressed state, the YC signals that are stored in the second memory 40 at this time are compressed into the predetermined compression format by the compression/expansion processing circuit 24, and are then recorded to the recording medium 42A as an image file.

Figure 5:
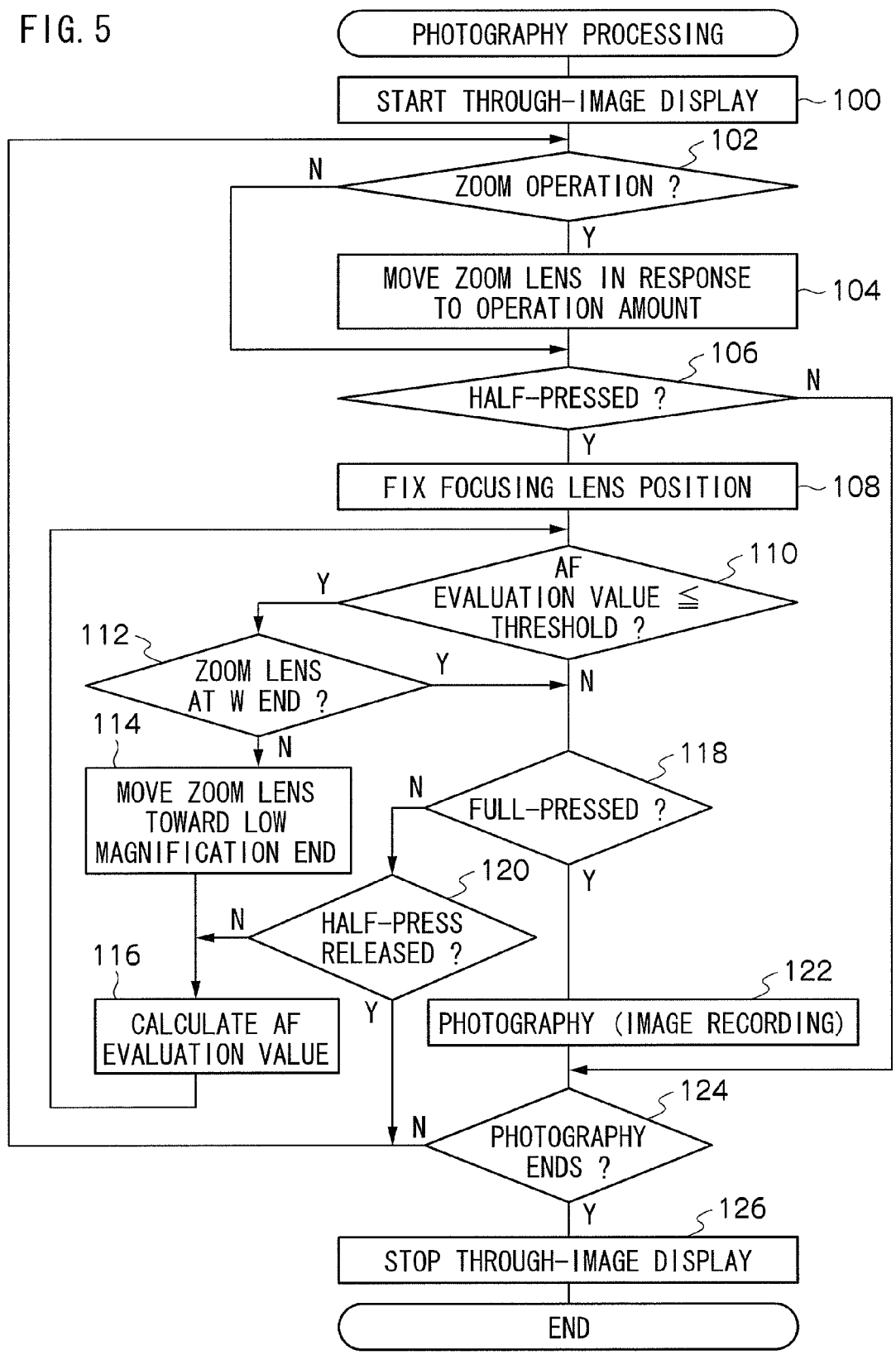
FIG. 5 is a flowchart showing a flow of photography processing relating to the first exemplary embodiment of the present invention.

FIG. 5 is a flowchart showing a flow of a photography processing program that is executed by the CPU 32 of the digital camera 10 when a photography mode has been set in accordance with a sliding position of the mode switch 56C. Herebelow, photography processing relating to the present exemplary embodiment will be described with reference to FIG. 5.

First, in step 100, display of the through-image is commenced. Then, in step 102, it is determined whether or not an operation signal representing operation of the zoom control 56E has been inputted. If this determination is positive, the processing advances to step 104. In step 104, the zoom lens is moved in accordance with an operation direction and operation amount of the zoom control 56E, after which the processing advances to step 106. On the other hand, if the determination in step 102 is negative, the processing advances to step 106 without executing the processing of step 104.

In step 106, it is determined whether or not an operation signal representing the release button 56A being put into the half-pressed state has been inputted. If this determination is positive, the processing advances to step 108 and the focusing lens position is fixed, after which the processing advances to step 110.

In step 110, it is determined whether or not the AF evaluation value detected by the AF detection circuit 34 is at or below the pre-specified threshold Th. If this determination is negative, the processing advances to step 118, and it is determined whether or not the release button 56A has been put into the full-pressed state. If the determination in step 118 is positive, the processing advances to step 122, and photography is implemented by image information provided via the CCD 14 being stored in the recording medium 42A as still image information. Then, the processing advances to step 124.

If the determination of step 118 is negative, the processing advances to step 120, and it is determined whether or not the half-pressed state of the release button 56A has been released. If the determination of step 120 is negative, the processing advances to step 116. If the determination of step 120 is positive, the processing returns to step 102.

Meanwhile, if the determination of step 110 is positive, it is judged that the zoom ratio is excessively high (FIG. 4A) or the target to be photographed has been misplaced due to hand shake (FIG. 4B), and the processing advances to step 112. In step 112, it is determined whether or not the position of the zoom lens is a position at which the viewing angle is maximized (a state in which the subject image is minimally reduced; i.e., the wide-angle end). If this determination is negative, the processing advances to step 114 and the zoom lens is moved toward the low magnification end, after which the processing advances to step 116. If the determination in step 112 is positive, it is judged that the zoom ratio is not excessively increased and that hand shake is not a factor at this zoom ratio, and the processing advances to step 118.

In step 116, the AF evaluation value detected by the AF detection circuit 34 in the current state is acquired, after which the processing returns to step 110.

In step 124, it is determined whether or not photography is to end. If this determination is negative, the processing returns to step 102 again. If switching into a replay mode has been instructed by operation of the mode switch 56C or cutting off of the power supply has been instructed by operation of the power switch 56B, the determination of step 124 is positive and the processing advances to step 126. In step 126, through-image display ends, after which the present photography processing ends.

As described above, in the digital camera 10 relating to this first exemplary embodiment, if the AF evaluation value when the contrast of the image is maximized is at or below the predetermined threshold Th in the state in which the focusing lens position is fixed by the AF control, the zoom ratio is lowered. Thus, a determination of composition by a photographer when altering a magnification ratio of a subject image and performing photography may be assisted.

In this first exemplary embodiment, when the zoom ratio is changed in accordance with the AF evaluation value, a message to that effect, or an icon or the like, may be displayed at the LCD 30.

Second Exemplary Embodiment

For the first exemplary embodiment, a mode has been described in which the zoom ratio is lowered if the AF evaluation value when the image contrast is maximized falls to or below the predetermined threshold value Th. For the second exemplary embodiment, a mode will be described in which the zoom ratio is lowered if a comparison value, which is calculated on the basis of AF evaluation values that correspond to a predetermined interval between images acquired via the CCD 14, is at or below a predetermined threshold value.

The structure of a digital camera relating to this second exemplary embodiment is similar to the structure of the digital camera 10 described in the first exemplary embodiment (see FIG. 1 and FIG. 2), and only the details of the photography processing differ. Herebelow therefore, the same reference numerals are assigned to the same structures and descriptions thereof are not given. Details of the photography processing are described with reference to the drawings.

Figure 6A:
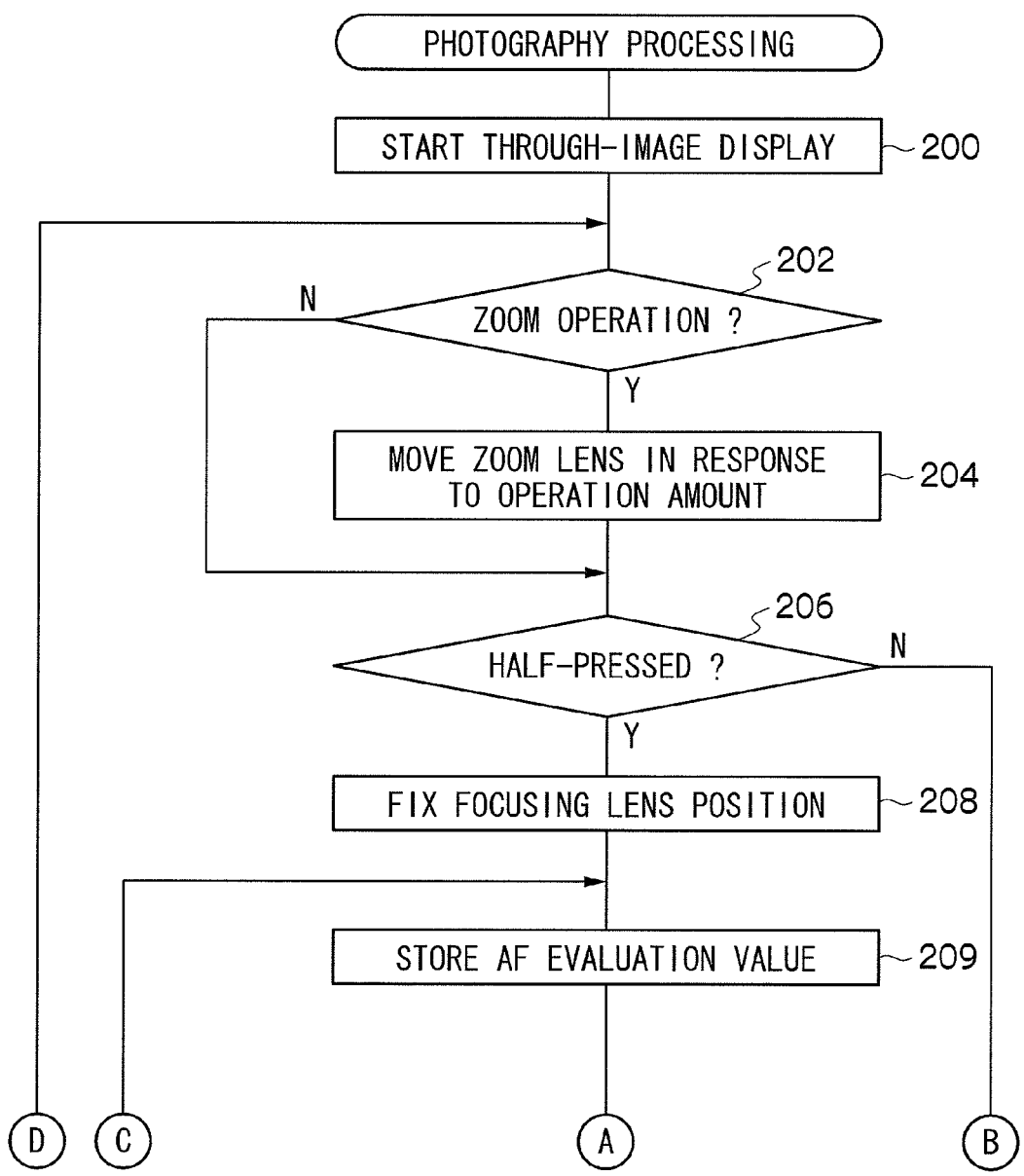
FIG. 6A and FIG. 6B are a flowchart showing a flow of photography processing relating to a second exemplary embodiment of the present invention.
Figure 6B:
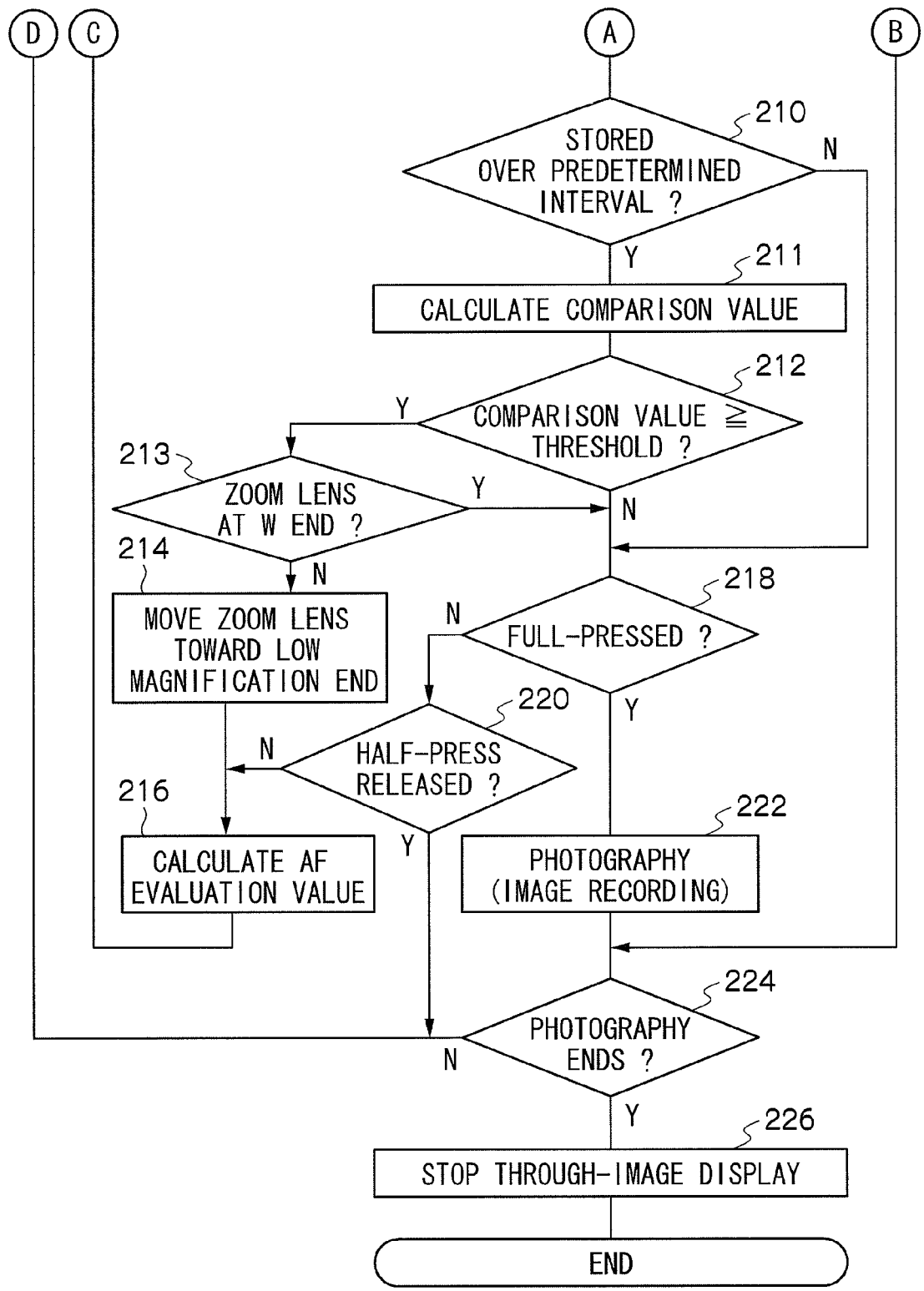

FIG. 6A and FIG. 6B are a flowchart showing a flow of a photography processing program that is executed by the CPU 32 of the digital camera 10 when the photography mode has been set in accordance with the sliding position of the mode switch 56C. Herebelow, the photography processing relating to the second exemplary embodiment will be described with reference to FIG. 6A and FIG. 6B.

First, in step 200, display of the through-image is commenced. Then, in step 202, it is determined whether or not an operation signal representing operation of the zoom control 56E has been inputted. If this determination is positive, the processing advances to step 204. In step 204, the zoom lens is moved in accordance with an operation direction and operation amount of the zoom control 56E, after which the processing advances to step 206. On the other hand, if the determination in step 202 is negative, the processing advances to step 206 without executing the processing of step 204.

In step 206, it is determined whether or not an operation signal representing the release button 56A being put into the half-pressed state has been inputted. If this determination is positive, the processing advances to step 208 and the focusing lens position is fixed, after which the processing advances to step 209.

In step 209, an acquired AF evaluation value is stored, after which the processing advances to step 210. In step 210, it is determined whether or not AF evaluation values corresponding to a predetermined interval have been stored. If this determination is positive, the processing advances to step 211. In step 211, a difference between the AF evaluation value that was acquired and stored the predetermined interval before and the AF evaluation value that was most recently acquired and stored is calculated to serve as a comparison value, after which the processing advances to step 212. In step 212, it is determined whether or not the calculated comparison value is at or above a pre-specified threshold value (here, the threshold value is positive). If this determination is negative, the processing advances to step 218, and it is determined whether or not the release button 56A has been put into the full-pressed state. If the determination in step 218 is positive, the processing advances to step 222, and photography is implemented by image information provided via the CCD 14 being stored in the recording medium 42A as still image information. Then, the processing advances to step 224.

Thus, in this second exemplary embodiment, the difference between the AF evaluation value acquired and stored the predetermined interval before and the AF evaluation value acquired and stored immediately before is calculated to serve as the comparison value, and it is judged that the AF evaluation value is falling significantly if this comparison value is at or above the pre-specified threshold value (the threshold value being positive).

If the determination of step 218 is negative, the processing advances to step 220, and it is determined whether or not the half-pressed state of the release button 56A has been released. If the determination of step 220 is negative, the processing advances to step 216. If the determination of step 220 is positive, the processing returns to step 202.

Meanwhile, if the determination of step 212 is positive, it is judged that the target to be photographed has been misplaced due to hand shake (FIG. 4B), and the processing advances to step 213. In step 213, it is determined whether or not the position of the zoom lens is the position at which the viewing angle is maximized (the state in which the subject image is minimally reduced; i.e., the wide angle end). If this determination is negative, the processing advances to step 214 and the zoom lens is moved toward the low magnification end, after which the processing advances to step 216. If the determination in step 213 is positive, it is judged that hand shake is not a factor at this zoom ratio, and the processing advances to step 218.

Here, when the zoom lens is moved toward the low magnification end, a movement amount may be so as to move the zoom lens toward the wide angle end by a fixed amount, or so as to move the zoom lens to a predetermined position.

In step 216, the AF evaluation value detected by the AF detection circuit 34 in this state is acquired, after which the processing returns to step 209.

In step 224, it is determined whether or not photography is to end. If this determination is negative, the processing returns to step 202 again. If switching into the replay mode has been instructed by operation of the mode switch 56C or cutting off of the power supply has been instructed by operation of the power switch 56B, the determination of step 224 is positive and the processing advances to step 226. In step 226, the through-image display ends, after which the present photography processing ends.

As described above, in the digital camera 10 relating to this second exemplary embodiment, the zoom ratio is lowered if, in the state in which the focusing lens position is fixed by the focusing control, the comparison value calculated on the basis of the AF evaluation values corresponding to the predetermined interval between images acquired via the CCD 14 is at or below the predetermined threshold. Thus, a determination of composition by a photographer when altering a magnification ratio of a subject image and performing photography may be assisted.

Here, a difference between an average value of AF evaluation values corresponding to the predetermined interval and the AF evaluation value acquired and stored most recently may be employed as the comparison value.

Figure 7:
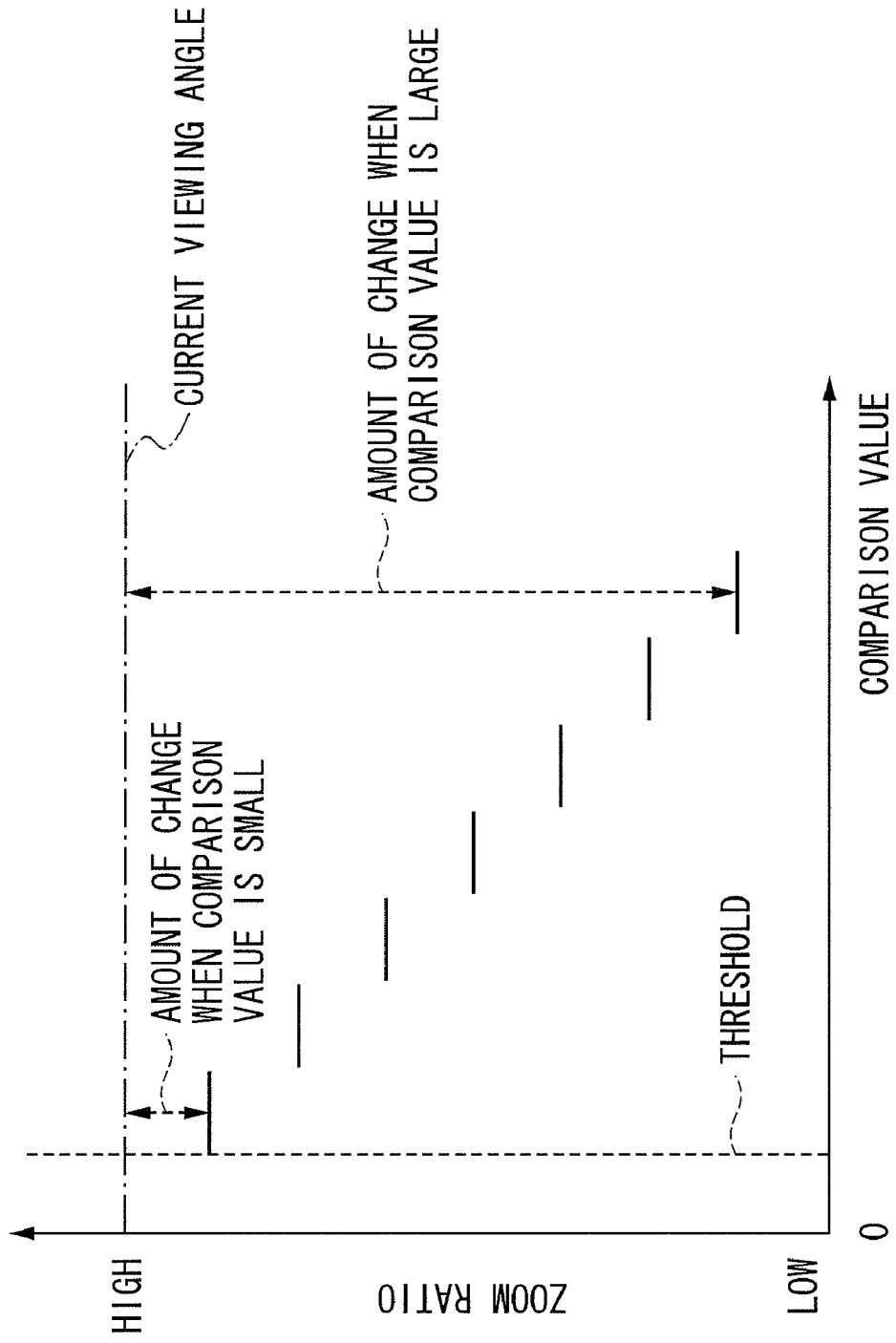
FIG. 7 is a graph showing an example of zoom ratio alteration amounts corresponding to comparison values, for a variant example of the second exemplary embodiment of the present invention.

Further, as shown in FIG. 7, when the zoom ratio is to be changed by the zoom lens being moved toward the low magnification end, an amount of the change in the zoom ratio may vary in a stepwise manner with respect to the comparison value. The zoom ratio change amount that corresponds to a comparison value may be determined using a pre-specified table, a function, plural thresholds or the like.

Figure 8A:
FIG. 8A, FIG. 8B, FIG. 8C, FIG. 8D and FIG. 8E are explanatory views of examples of changes in display states when the control shown in FIG. 7 is performed.
Figure 8B:
Figure 8D:
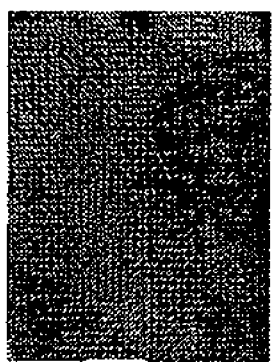
Figure 8C:
Figure 8E:

That is, as shown in FIG. 8A to FIG. 8E, the comparison value in a case of going from the state shown in FIG. 8A to the state shown in FIG. 8B is smaller than a comparison value in a case of going from the state shown in FIG. 8A to the state shown in FIG. 8D. Therefore, in the case of going from FIG. 8A to FIG. 8B, there is a high likelihood of the target of photography not being greatly displaced, or of the target of photography being displaced but a subject image included in the photography region being identifiable. Therefore, as shown in FIG. 8C, even if the zoom ratio is changed a little, a user can easily re-adjust the viewing angle. In contrast, in the case of going from FIG. 8A to FIG. 8D, there is a high likelihood of the target of photography being greatly displaced or of it being difficult to identify a subject included in the photography region because the AF evaluation value is too low. Therefore, as shown in FIG. 8E, the zoom ratio is greatly changed to facilitate identification of the subject image by the user.

In this second exemplary embodiment, when the zoom ratio is changed in accordance with the comparison value, a message to that effect, or an icon or the like, may be displayed at the LCD 30.

Third Exemplary Embodiment

For the first exemplary embodiment and the second exemplary embodiment, modes have been described in which the zoom ratio is lowered in accordance with AF evaluation values at which image contrast is maximized. For the third exemplary embodiment, a mode will be described in which, in accordance with change amounts of AF evaluation values of division regions, a display of advice that shows a direction to a subject image to a user is implemented.

The structure of a digital camera relating to this third exemplary embodiment is similar to the structure of the digital camera 10 described in the first exemplary embodiment (see FIG. 1 and FIG. 2), and only the details of the photography processing differ. Herebelow therefore, the same reference numerals are assigned to the same structures and descriptions thereof are not given. Details of the photography processing are described with reference to the drawings.

Figure 9A:
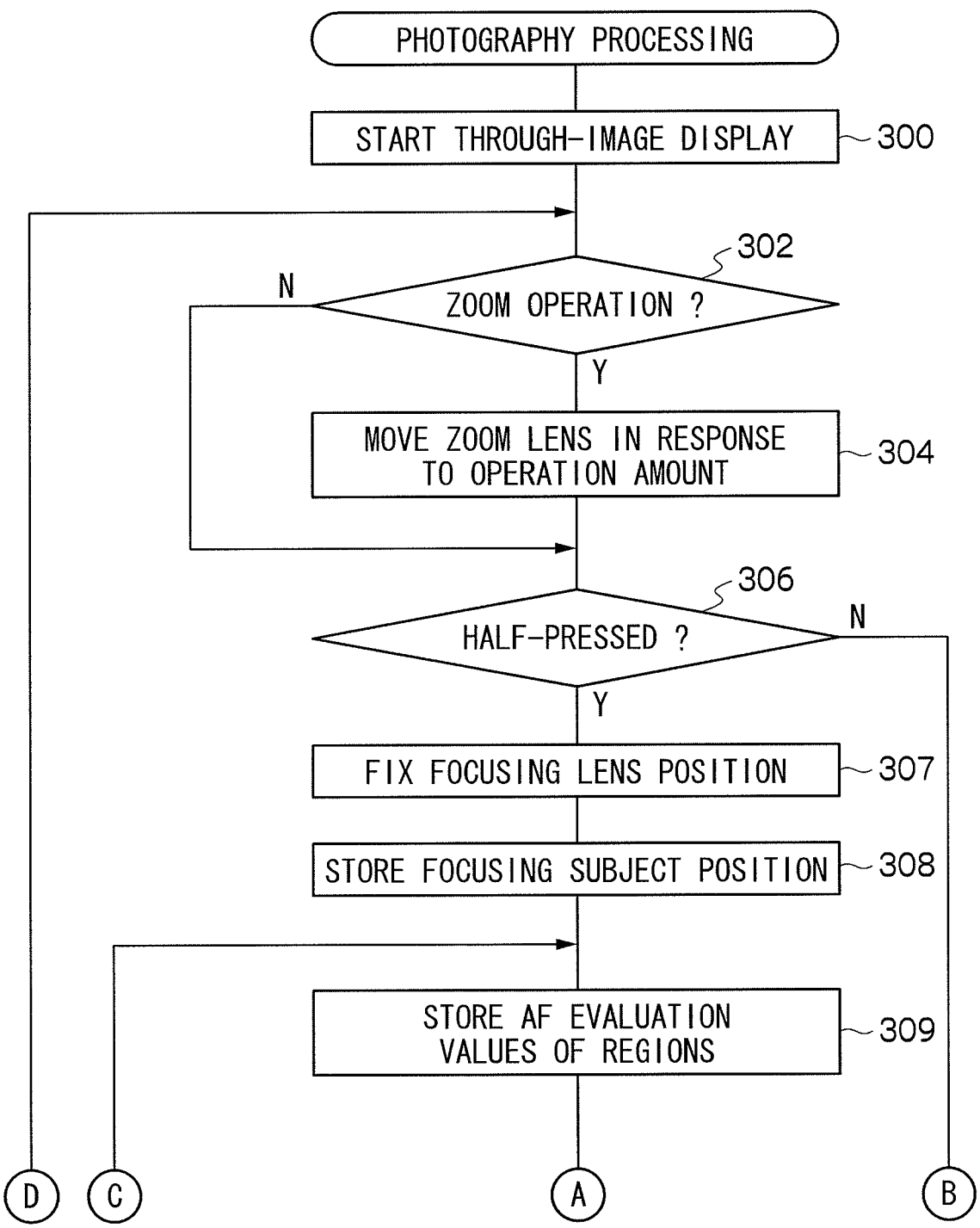
FIG. 9A and FIG. 9B are a flowchart showing a flow of photography processing relating to a third exemplary embodiment of the present invention.
Figure 9B:
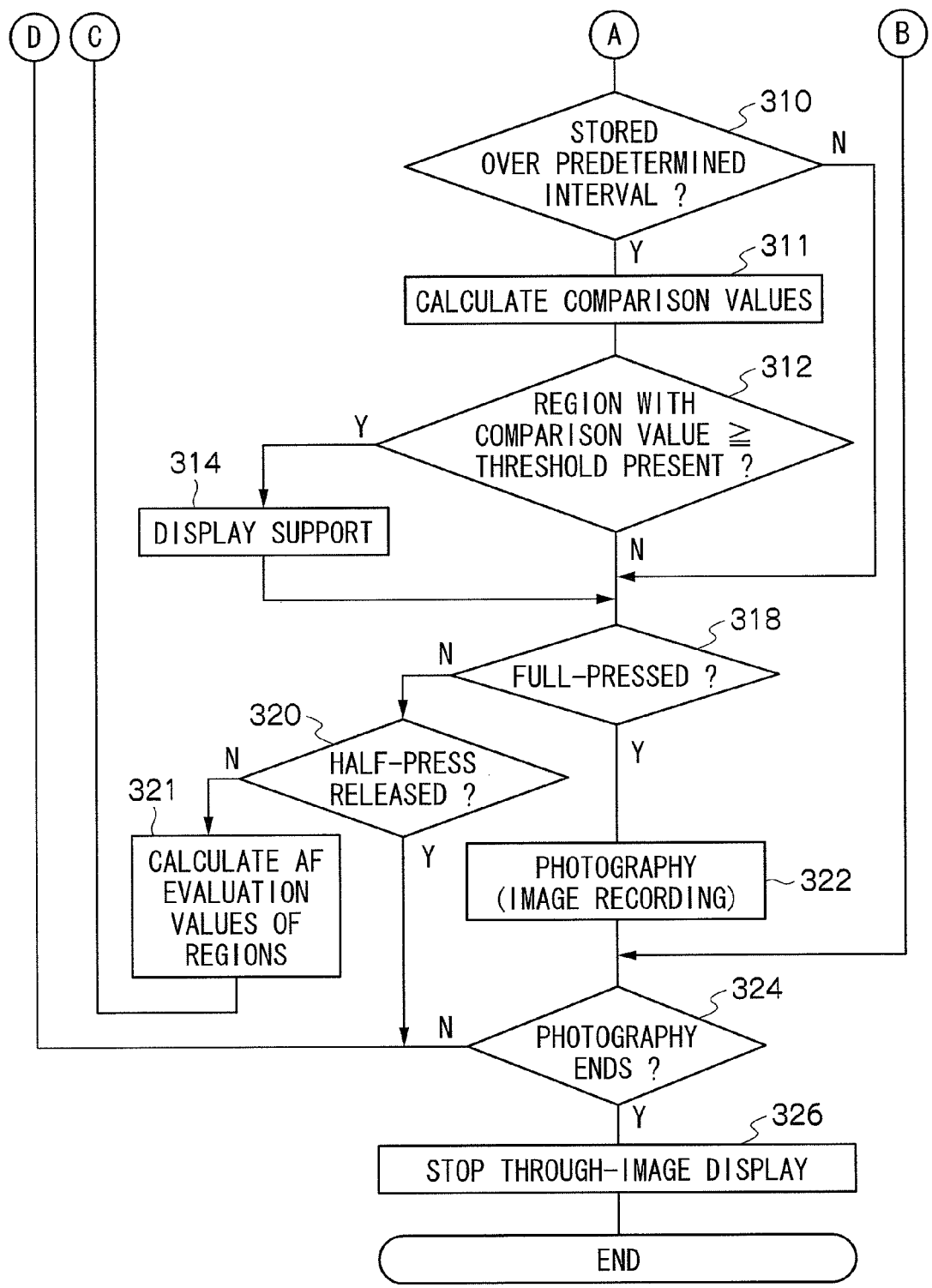

FIG. 9A and FIG. 9B are a flowchart showing a flow of a photography processing program that is executed by the CPU 32 of the digital camera 10 when the photography mode has been set in accordance with the sliding position of the mode switch 56C. Herebelow, the photography processing relating to the third exemplary embodiment will be described with reference to FIG. 9A and FIG. 9B.

First, in step 300, display of the through-image is commenced. Then, in step 302, it is determined whether or not an operation signal representing operation of the zoom control 56E has been inputted. If this determination is positive, the processing advances to step 304. In step 304, the zoom lens is moved in accordance with an operation direction and operation amount of the zoom control 56E, after which the processing advances to step 306. On the other hand, if the determination in step 302 is negative, the processing advances to step 306 without executing the processing of step 304.

In step 306, it is determined whether or not an operation signal representing the release button 56A being put into the half-pressed state has been inputted. If this determination is positive, the processing advances to step 307 and the focusing lens position is fixed, after which the processing advances to step 308. In step 308, division regions that are used by the AF function are stored to serve as positions of focusing subjects, after which the processing advances to step 309.

Figure 10D:
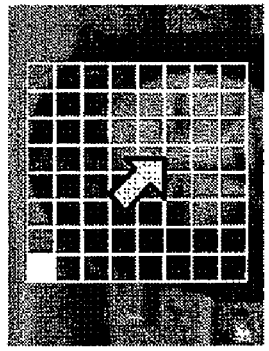
FIG. 10A, FIG. 10B, FIG. 10C and FIG. 10D are explanatory views showing examples of display states in the photography processing relating to the third exemplary embodiment of the present invention.
Figure 10C:
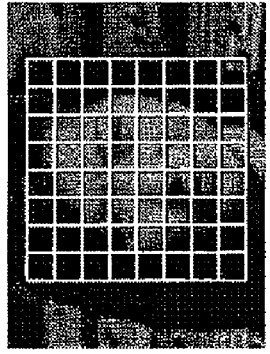
Figure 10B:
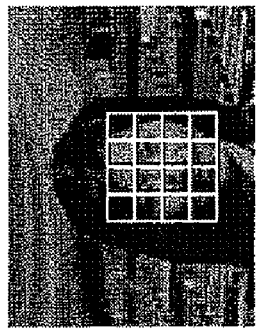
Figure 10A:

As is shown in FIG. 10A to FIG. 10C, in the present exemplary embodiment, positions and numbers of the division regions that are used by the AF function and the AE function are linked in relation with the size of a focusing subject included in the photography region. That is, as shown in FIG. 10A, when the zoom ratio is low, positions of the division regions used by the AF function and the AE function are set to positions of the focusing subject, and the number of division regions is set to 4 in accordance with the size of the focusing subject. Then, as the zoom ratio is increased, as shown in FIG. 10B and FIG. 10C, the size of the subject included in the photography region increases, and accordingly the positions of the division regions that are used by the AF function and the AE function are set to positions of the focusing subject and the number of division regions increases in accordance with the size of the focusing subject.

In step 309, AF evaluation values of the regions stored as positions of the focusing subject are respectively stored, after which the processing advances to step 310. In step 310, it is determined whether or not AF evaluation values that correspond to a predetermined interval have been stored. If this determination is positive, the processing advances to step 311. In step 311, differences between the AF evaluation values that were acquired and stored the predetermined interval before and the AF evaluation values that were most recently acquired and stored are calculated to serve as comparison values, after which the processing advances to step 312. In step 312, it is determined whether or not any of the calculated comparison values is at or above a pre-specified threshold value (here, the threshold value is positive). If this determination is negative, the processing advances to step 318, and it is determined whether or not the release button 56A has been put into the full-pressed state. If the determination in step 318 is positive, the processing advances to step 322, and photography is implemented by image information provided via the CCD 14 being stored in the recording medium 42A as still image information. Then, the processing advances to step 324.

Thus, in this third exemplary embodiment, the differences between the AF evaluation values acquired and stored the predetermined interval before and the AF evaluation values acquired and stored immediately before are calculated to serve as the comparison values, and it is judged that an AF evaluation value is falling significantly if the comparison value thereof is at or above the pre-specified threshold value (the threshold value being positive).

If the determination of step 318 is negative, the processing advances to step 320, and it is determined whether or not the half-pressed state of the release button 56A has been released. If the determination of step 320 is negative, the processing advances to step 321. If the determination of step 320 is positive, the processing returns to step 302.

Meanwhile, if the determination of step 312 is positive, it is judged that the target to be photographed has been misplaced due to hand shake (FIG. 4B), and the processing advances to step 314. In step 314, display of advice recommending that the lens be turned to the direction opposite from the region at which the difference in the AF evaluation value is largest is performed, after which the processing advances to step 318.

If the image obtained via the CCD 14 goes from the state shown in FIG. 10C to the stage shown in FIG. 10D, the region at which the difference in the AF evaluation value is largest is the division region that appears as solid white in FIG. 10D. In the example shown in FIG. 10D, an arrow indicating the opposite direction from the region at which the difference in the AF evaluation value is largest is employed as the advice display.

In step 321, the AF evaluation values of the division regions detected by the AF detection circuit 34 in this state are acquired, after which the processing returns to step 309.

In step 324, it is determined whether or not photography is to end. If this determination is negative, the processing returns to step 302 again. If switching into the replay mode has been instructed by operation of the mode switch 56C or cutting off of the power supply has been instructed by operation of the power switch 56B, the determination of step 324 is positive and the processing advances to step 326. In step 326, the through-image display ends, after which the present photography processing ends.

As described above, in the digital camera 10 relating to this third exemplary embodiment, an AF evaluation value of the image acquired via the CCD 14 is calculated for each of plural division regions, and advice display showing the direction of a subject to the user is performed on the basis of amounts of change of the AF evaluation values of the division regions. Thus, a determination of composition by a photographer when altering a magnification ratio of a subject image and performing photography may be assisted.

Note that the constitution of the digital camera 10 described in the above exemplary embodiments (see FIG. 1 and FIG. 2) and the flows of photography processing (see FIG. 5, FIG. 6A and FIG. 6B, FIG. 9A and FIG. 9B) are examples; suitable modifications are applicable within a scope not departing from the spirit of the present invention.

What is claimed is:

1. A photography device comprising:
    an imaging component that images a subject and acquires an image representing the subject;
    a focusing component that focuses a subject image on an imaging surface of the imaging component;
    a magnification alteration component that alters a magnification of the subject image focused by the focusing component;
    a display component that displays the subject image in real time on the basis of information of the image acquired by the imaging component;
    an acquisition component that acquires a focusing evaluation value representing a degree of focusing of the subject image by the focusing component;
    a control component that performs focusing control by controlling the focusing component such that the focusing evaluation value acquired by the acquisition component is at a maximum, and controls the magnification alteration component so as to lower a display magnification of the subject image by the display component if the focusing evaluation value is at or below a pre-specified threshold value; and
    a storage component that stores the focusing evaluation value acquired by the acquisition component, wherein:
    the control component controls so as to lower the display magnification of the subject image by the display component if the focusing evaluation value acquired by the acquisition component at a current point in time has fallen by at least a pre-specified threshold value from the focusing evaluation value stored by the storage component a predetermined duration before, and
    the control component increases a degree of the lowering of the display magnification by the display component in accordance with a magnitude of a degree of the fall of the focusing evaluation value.

2. The photography device of claim 1, wherein the control component, before controlling so as to lower the display magnification of the subject image by the display component, controls the display component so as to implement a pre-specified display relating to this control.

3. A photography method comprising:
    (a) displaying, in real time at a display component, a subject image based on information of an image that is focused at an imaging surface of an imaging component, which images a subject and acquires the image representing the subject;
    (b) acquiring a focusing evaluation value representing a degree of focusing of the subject image;
    (c) performing focusing control that focuses the subject image at the imaging surface such that the acquired focusing evaluation value is at a maximum and, if the focusing evaluation value is at or below a pre-specified threshold value, controlling so as to lower a display magnification of the subject image by the display component, and
    (d) storing the focusing evaluation value acquired in (b) at a storage component, wherein:
    (c) includes, if the focusing evaluation value acquired by (b) at a current point in time has fallen by at least a pre-specified threshold value from the focusing evaluation value stored at the storage component a predetermined duration before, controlling so as to lower the display magnification of the subject image by the display component, and
    (c) includes increasing a degree of the lowering of the display magnification by the display component in accordance with a magnitude of a degree of the fall of the focusing evaluation value.

4. The photography method of claim 3, wherein (c) includes, before controlling so as to lower the display magnification of the subject image by the display component, controlling the display component so as to implement a pre-specified display relating to this control.

* * * * *